(12) United States Patent
Shimura et al.

(10) Patent No.: US 7,101,934 B2
(45) Date of Patent: Sep. 5, 2006

(54) COATING COMPOSITION USED FOR GOLF BALL AND GOLF BALL USING THE SAME

(75) Inventors: Noriyuki Shimura, Washimiya (JP); Kazuya Sugimoto, Washimiya (JP); Yutaka Miyata, Kuki (JP); Takashi Ohira, Chichibu (JP)

(73) Assignees: Asia Industry Co., Ltd., Tokyo (JP); Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 10/372,234

(22) Filed: Feb. 25, 2003

(65) Prior Publication Data

US 2003/0187152 A1   Oct. 2, 2003

(30) Foreign Application Priority Data

Feb. 28, 2002   (JP) ............................. 2002-054072

(51) Int. Cl.
*C09D 133/14* (2006.01)
*C09D 175/04* (2006.01)
*A63B 37/00* (2006.01)

(52) U.S. Cl. ...................... 525/127; 525/123; 525/131; 473/351; 473/371

(58) Field of Classification Search ................ 525/123, 525/127, 131
See application file for complete search history.

(56) References Cited

U.S. PATENT DOCUMENTS 6,130,286 A * 10/2000 Thomas et al. ............. 524/507

6,180,714 B1 * 1/2001 Ohira et al. ................. 524/590
6,649,688 B1 * 11/2003 Mayer et al. ................ 524/558
2002/0102425 A1 * 8/2002 Delmotte et al. ........... 428/520

FOREIGN PATENT DOCUMENTS

| JP | 06220397 | * | 8/1994 |
| JP | 8-206255 A | | 8/1996 |
| JP | 9-59566 A | | 3/1997 |
| JP | 10-234884 A | | 9/1998 |
| JP | 11-146930 A | | 6/1999 |

* cited by examiner

*Primary Examiner*—David J. Buttner
(74) *Attorney, Agent, or Firm*—Sughrue Mion, PLLC

(57) ABSTRACT

An object of the present invention is to provide a coating composition used for a golf ball, which is superior in not only abrasion resistance and impact resistance but also weather resistance to a conventional coating used for a golf ball.

According to the present invention, there is provided a coating composition used for a golf ball, which comprises (A) a polyester- and/or polyether-containing acrylic polyol having a hydroxyl value of from 30 to 180 mg KOH/g(solid) and (B) a polyisocyanate, wherein the component (A) is composed of a main chain comprising an acrylic polymer and a side chain comprising a polyester and/or a polyether, and a molar ratio of an isocyanate group in the component (B) to a hydroxyl group in the component (A), [NCO]/[OH], is from 0.5 to 1.5.

7 Claims, No Drawings

COATING COMPOSITION USED FOR GOLF BALL AND GOLF BALL USING THE SAME

BACKGROUND OF THE INVENTION

The present invention relates to a coating composition used for a golf ball and a golf ball coated with the coating composition.

Finishing with a coating has been applied to a golf ball for the purpose of protecting a surface of the ball and to maintain the appearance thereof. As such a coating used for a golf ball, there is known a urethane coating containing a main agent comprising a polyol component and a curing agent comprising a polyisocyanate component, which are cured with each other in the presence of a catalyst. Impact resistance and abrasion resistance of a coat film formed on a surface of a golf ball can be improved using the urethane coating, and a golf ball resistant to repeated strokes with a golf club has been developed.

For example, as such a coating used for a golf ball which can exhibit superior impact resistance and abrasion resistance, JP-A 8-206255 proposes a coating composition used for a golf ball, which comprises an acrylic polyol, a polyester polyol or its product modified with an aliphatic acid and a curing agent. In said JP-A, it is described that there can be obtained a coating composition capable of providing a golf ball superior in impact resistance and abrasion resistance, and little in scratch even at the time of a bunker shot.

However, the coating now used for the surface finishing of a golf ball has been increasingly desired to have higher quality and higher performance, and it has been clarified that a conventional urethane coating has a limit to improve the impact resistance and abrasion resistance of the obtained coat film. Further, the coating used for a golf ball has been desired to be difficult to scratch and to have impact resistant and abrasion resistant characteristics, so that it is resistant to repeated strokes with a golf club. In recent years, the coating used for a golf ball has been strongly desired to have also superior weather resistance, so that it is hardly deteriorated even when used outdoors for a long period of time.

DISCLOSURE OF THE INVENTION

The present invention is based on such a demand. An object of the present invention is to provide a coating composition used for a golf ball not only having impact resistance and abrasion resistance superior to a conventional coating used for a golf ball, but also having superior weather resistance. Another object of the present invention is to provide a golf ball coated with said coating composition.

The present inventors have undertaken extensive studies on a component used for the urethane coating composition to accomplish the above-mentioned objects. As a result, it has been found that when a polyester- and/or polyether-containing acrylic polyol having a specific hydroxyl value is used as the polyol component, not only abrasion resistance and impact resistance of the obtained coat film can be markedly improved, but also weather resistance thereof can be made extremely superior. Thereby, the present invention has been accomplished.

That is, the present invention provides a coating composition used for a golf ball, which comprises (A) a polyester- and/or polyether-containing acrylic polyol having a hydroxyl value of from 30 to 180 mg KOH/g(solid) and (B) a polyisocyanate, wherein the component (A) is composed of a main chain comprising an acrylic polymer and a side chain comprising a polyester and/or a polyether, and a molar ratio of an isocyanate group in the component (B) to a hydroxyl group in the component (A), [NCO]/[OH], is from 0.5 to 1.5. Furthermore, the present invention provides a golf ball coated with such a coating composition.

BEST MODE FOR CARRYING OUT THE INVENTION

As mentioned above, the coating composition used for a golf ball in accordance with the present invention comprises (A) a polyester- and/or polyether-containing acrylic polyol having a hydroxyl value of from 30 to 180 mg KOH/g(solid) and (B) a polyisocyanate. First of all, these components are explained as follows.

<Component (A)>

The polyester- and/or polyether-containing acrylic polyol of the component (A) has a hydroxyl value of from 30 to 180 mg KOH/g (solid), and preferably from 50 to 150 mg KOH/g (solid). When the hydroxyl value is less than 30 mg KOH/g (solid), a cross-linking is not enough and therefore the abrasion resistance and the impact resistance of the obtained coat film become insufficient. Whereas, when the hydroxyl value exceeds 180 mg KOH/g (solid), viscosity of the coating composition is too high, and as a result, physical properties of the coat film deteriorate and workability of the coating becomes poor, and further pot life is shortened. The hydroxyl value of the component (A) can be measured according to JIS K 0070 7.1.

The "polyester- and/or polyether-containing acrylic polyol" in the present invention is composed of a main chain comprising an acrylic polymer and a side chain comprising a polyester and/or a polyether. That is, the component (A) in the present invention includes:

(a) a polyester-containing acrylic polyol having a main chain comprising an acrylic polymer and a side chain comprising a polyester;

(b) a polyether-containing acrylic polyol having a main chain comprising an acrylic polymer and a side chain comprising a polyether; and (c) a polyester- and polyether-containing acrylic polyol having a main chain comprising an acrylic polymer and a side chain comprising a polyester and a polyether. In the present invention, it is permitted to use a combination of two or more selected from the above-mentioned (a), (b) and (c) as the component (A).

Here, there is no great difference between respective performances of the coat film obtained when any one of (a) the polyester-containing acrylic polyol, (b) the polyether-containing acrylic polyol or (c) the polyester- and polyether-containing acrylic polyol is used as the component (A), and that obtained when a combination of two or more selected from these (a), (b) and (c) is used as the component (A). However, in the case where the polyester-containing acrylic polyol is used, temperature dependency of the coat film can be diminished as compared with the case where the polyether-containing acrylic polyol is used, so that elasticity can be maintained even at a low temperature. As a result, there can be obtained a golf ball, which is more difficult to produce cracks due to repeated strokes with a golf club even at a low temperature like in winter. On the other hand, in the case where the polyether-containing acrylic polyol is used, the coat film easily becomes superior in hydrolysis resistance to the case where the polyester-containing acrylic polyol is used. As a result, there can be obtained a golf ball, which is more difficult to deteriorate even when allowed to stand outdoors and in water for a long period of time.

With respect to the polyester- and/or polyether-containing acrylic polyol of the component (A), an amount of the polyester and/or polyether, namely the side chain, is preferably from 2 to 50% by weight (solid) based on the whole weight of the component (A), and more preferably from 10 to 30% by weight (solid) based thereon. When the amount of the polyester and/or polyether to the whole component (A) is too small, the abrasion resistance and the impact resistance of the coat film are apt to decrease. When it is too large, the stain resistance and the weather resistance are apt to deteriorate.

With respect to a molecular weight of the component (A), a number average molecular weight (a number average molecular weight measured by GPC relative to polystyrene standard) thereof is preferably from 3,000 to 30,000, and more preferably from 4,000 to 20,000. When the number average molecular weight is less than 3,000, a desired abrasion resistance may not be obtained. When it exceeds 30,000, viscosity of the coating is too high, so that finishing workability is apt to deteriorate.

Successively, a structure of the component (A) is explained. A structure of the acrylic polymer, which is a main chain of the component (A), is not particularly limited, and may be any one as far as it has a repeating unit of acrylic structure as a basic skeleton. That is, it is preferred that a repeating unit derived from an acrylic monomer mentioned below is not less than 50% based on the whole monomer constituting the component (A). The acrylic monomer constituting the main chain may be one or two or more. Further, it is permitted to use a copolymer of the acrylic monomer and a different monomer copolymerizable therewith.

It is preferred that the polyester and the polyether, which are each a side chain of the component (A), have a structure represented by the following formula, wherein R, R' and R" are independently of one another an alkylene group having 1 to 12 carbon atoms, n is an integer of 1 to 20, and m is an integer of 1 to 40.

(Polyester)

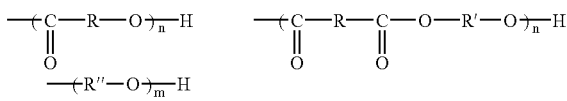

The component (A) in the present invention may have a side chain having a structure formed in a manner such that an ester and an ether are linked with each other. Further, the side chain may have a structure formed in a manner such that more than one ester and more than one ether are randomly or alternately linked with one another.

With respect to a specific structure of the component (A), examples thereof include (i) those obtained by adding a side chain-constituting component such as a lactone and an alkylene oxide to a main chain of the acrylic polymer, (ii) those obtained by grafting a side chain to a main chain of the acrylic polymer in a manner such that another monomer and an initiator are added to the acrylic polymer, thereby polymerizing the monomer, (iii) those obtained by homopolymerizing a polyester-added acrylic monomer (hereinafter referred to as "polyester-containing acrylic monomer") and/or a polyether-added acrylic monomer (hereinafter referred to as "polyether-containing acrylic monomer), and (iv) those obtained by copolymerizing the polyester-containing acrylic monomer and/or the polyether-containing acrylic monomer with another acrylic monomer.

In the present invention, from a viewpoint of properties of the coating composition and facility of adjustment of the physical properties of the coat film, it is preferred that the component (A) is a copolymer comprising at least two acrylic monomers. Further, it is preferred that the acrylic monomer contains the polyester-containing acrylic monomer (a1), the polyether-containing acrylic monomer (a2), or a combination of the polyester-containing acrylic monomer (a1) and the polyether-containing acrylic monomer (a2).

In other words, it is preferred that the acrylic monomer comprises the polyester-containing acrylic monomer (a1) when the component (A) is the polyester-containing acrylic polyol, the acrylic monomer comprises the polyether-containing acrylic monomer (a2) when the component (A) is the polyether-containing acrylic polyol, and the acrylic monomer comprises the polyester-containing acrylic monomer (a1) and the polyether-containing acrylic monomer (a2) when the component (A) is the polyester- and polyether-containing acrylic polyol.

In the present invention, an amount of the acrylic monomer (a1) and/or (a2) is preferably from 5 to 50% by weight based on the total weight of the monomers, and more preferably from 10 to 30% by weight based thereon. When the amount of the acrylic monomer (a1) and/or (a2) is less than 5% by weight based on the total weight of the monomers constituting the component (A), the abrasion resistance and the impact resistance of the coat film cannot be said to be sufficient. When it exceeds 50% by weight, a liquid property of the coating becomes bad to deteriorate finishing workability.

More specifically, when the component (A) is the polyester-containing acrylic polyol, an amount of the polyester-containing acrylic monomer (a1) is preferably from 5 to 50% by weight based on the total weight of the monomers constituting the component (A), and more preferably from 10 to 30% by weight based thereon.

Further, when the component (A) is the polyether-containing acrylic polyol, an amount of the polyether-containing acrylic monomer (a2) is preferably from 5 to 50% by weight based on the total weight of the monomers constituting the component (A), and more preferably from 10 to 30% by weight based thereon.

Still further, when the component (A) is the polyester- and polyether-containing acrylic polyol, a total amount of the polyester-containing acrylic monomer (a1) and the polyether-containing acrylic monomer (a2) is preferably from 5 to 50% by weight based on the total weight of the monomers constituting the component (A), and more preferably from 10 to 30% by weight based thereon.

Here, the "polyester-containing acrylic monomer (a1)" includes, for example, a monomer having a structure represented by the following formula,

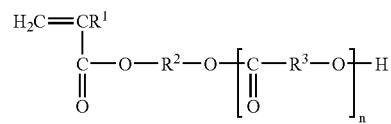

wherein $R^1$ is hydrogen or an alkyl group having 1 to 4 carbon atoms, $R^2$ and $R^3$ are independently of each other an alkylene group having 1 to 12 carbon atoms, and n is an integer of from 1 to 20. In the present invention, it is preferred that $R^1$ is —$CH_3$, $R^2$ is —$C_2H_4$— and $R^3$ is —$C_5H_{10}$—.

In the present invention, among those having the above-mentioned structure, a lactone-modified (meth)acrylate of a hydroxyl group terminal is preferably used as the component (a1). As the lactone-modified (meth)acrylate of a hydroxyl group terminal, those obtained by ring-opening adding a lactone compound in an amount of from 1 to 10 mol to a hydroxyl group-containing acrylic monomer using a catalyst are exemplified. Examples of the lactone compound include ε-caprolactone, β-propiolactone, γ-butyrolactone and δ-valerolactone. Specific examples thereof are "PLACCEL FM series (PLACCEL FM-3 etc.)" (caprolactone-modified methacrylate) and "PLACCEL FA series" (caprolactone modified acrylate), which are manufactured by Daicel Chemical Industries, Ltd.

The "polyether-containing acrylic monomer (a2)" includes, for example, a monomer having a structure represented by the following formula,

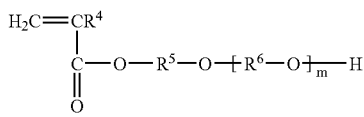

wherein $R^4$ is hydrogen or an alkyl group having 1 to 4 carbon atoms, $R^5$ and $R^6$ are independently of each other an alkylene group having 1 to 12 carbon atoms, and m is an integer of from 1 to 40. In the present invention, it is particularly preferred that $R^4$ is —$CH_3$, $R^5$ is —$C_3H_6$— and $R^6$ is —$C_3H_6$—.

In the present invention, among those having the above-mentioned structure, a polyalkylene glycol (meth)acrylate of a hydroxyl group terminal is preferably used as the component (a2). As the polyalkylene glycol(meth)acrylate of a hydroxyl group terminal, those obtained by adding an alkylene oxide to a hydroxyl group-containing acrylic monomer are exemplified. Specific examples thereof include poly(oxyalkylene)ether glycol monoacrylate and poly(oxyalkylene)ether glycol monomethacrylate. More specific examples thereof are "BLEMMER-PE series" (polyethylene glycol monomethacrylate), "BLEMMER-AE series" (polyethylene glycol monoacrylate), "BLEMMER-PP series" (polypropylene glycol monomethacrylate) and "BLEMMER-AP series" (polypropylene glycol monoacrylate), which are produced by NOF Corporation.

It is permitted to use a different acrylic monomer (a3) as the component (A)-constituting acrylic monomer other than the above-mentioned (a1) and (a2). A kind of such an acrylic monomer (a3) is not particularly limited. Examples thereof include (meth)acrylic acid, methyl (meth)acrylate, ethyl (meth)acrylate, n-propyl (meth)acrylate, i-propyl (meth)acrylate, n-butyl (meth)acrylate, i-butyl (meth)acrylate, tert-butyl (meth)acrylate, n-hexyl (meth)acrylate, 2-ethylhexyl (meth)acrylate, lauryl (meth)acrylate, stearyl (meth)acrylate, cyclohexyl (meth)acrylate, benzyl (meth)acrylate, glycidyl (meth)acrylate, N,N-dimethylaminoethyl (meth)acrylate, N,N-diethylaminoethyl (meth)acrylate, γ-methacryloxypropyl trimethoxysilane, acrylonitrile, acrylamide, N,N-dimethylacrylamide and diacetoneacrylamide.

Further, as the acrylic monomer (a3), it is permitted to use a hydroxyl group-containing acrylic monomer such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, N-methylol acrylamide and carbonate-modified methacrylate (HEMAC manufactured by Daicel Chemical Industries, Ltd.).

Furthermore, in addition to the above-mentioned acrylic monomers (a1), (a2) and (a3), the component (A) may contain an unsaturated monomer (a4), which is copolymerizable with said acrylic monomers, as the monomer component. Examples of the unsaturated monomer (a4) include:
  vinyl ester compounds such as vinyl acetate and vinyl propionate;
  vinyl ether compounds such as vinyl methyl ether, vinyl cyclohexyl ether, vinyl phenyl ether, vinyl benzyl ether and vinyl glycidyl ether;
  ethylenically unsaturated double bond-containing aromatic compounds such as styrene, vinyltoluene and α-methylstyrene;
  halogenated vinyl compounds such as vinyl chloride and vinyl bromide;
  halogenated vinylidene compounds such as vinylidene chloride and vinylidene bromide;
  maleic acid diesters such as dialkyl maleates;
  fumaric acid diesters such as dialkyl fumarates;
  itaconic acid diesters such as dimethyl itaconate;
  heterocyclic vinyl compounds such as N-vinylpyrrolidone and 2-vinylpyridine; and
  allyl compounds such as allyl alcohol, glycerol monoallyl ether and glycerol diallyl ether.

In the present invention, particularly from a viewpoint of the impact resistance and the weather resistance, it is preferred that the component (A) is a copolymer composed of the polyester-containing acrylic monomer, methyl (meth)acrylate and the hydroxyl group-containing (meth)acrylate, and it is particularly preferred that the component (A) is a copolymer composed of the caprolactone-modified methacrylate, methyl methacrylate and 2-hydroxyethyl methacrylate.

How to obtain the above-mentioned copolymer composed of at least two acrylic monomers is not particularly limited. According to a conventional process for producing an acrylic polyol, respective monomer components suitably selected may be put in a solvent, and copolymerization may be carried out with the aid of a polymerization initiator such as a radical generator.

For example, the polyester-containing acrylic monomer (a1) and if desired the acrylic monomer (a3) (and/or (a4)) are subjected to radical polymerization, thereby obtaining a polyester-containing acrylic polyol, and the polyether-containing acrylic monomer (a2) and if desired the acrylic monomer (a3) (and/or (a4)) are subjected to radical polymerization, thereby obtaining a polyether-containing acrylic polyol. Further, the polyester-containing acrylic monomer (a1), the polyether-containing acrylic monomer (a2) and if desired the acrylic monomer (a3) (and/or (a4)) are subjected to radical polymerization, thereby obtaining a polyester- and polyether-containing acrylic polyol.

Incidentally, when the component (A) is that obtained by adding the side chain-constituting component such as a lactone and an alkylene oxide to the main chain of the acrylic polymer, as mentioned above, first of all, the acrylic monomer (a3) (and if desired the unsaturated monomer (a4)) may be polymerized to form the main chain of the acrylic polymer, and then a lactone or an alkylene oxide may be added to the obtained polymer, thereby obtaining the component (A).

The radical generator used in the polymerization is not limited, and those so far known can be used. Examples of the radical generator (polymerization initiator) include azo compounds such as 2,2'-azobisisobutyronitrile, 2,2'-azobis-2-methylbutyronitrile, dimethyl-2,2'-azobisisobutyrate, azobiscyanovaleric acid, 1,1'-azobis-(cyclohexane-1-carbonitrile), 2,2'-azobis-(2,4-dimethylvaleronitrile) and 2,2'-azobis-(4-methoxy-2,4-dimethylvaleronitrile); and organic peroxides such as benzoyl peroxide, t-butyl perbenzoate, t-butyl hydroperoxide, di-t-butyl peroxide, cumene hydroperoxide and t-butylperoxy-2-ethylhexanoate. These may be used singly or in a combination of two or more.

Examples of the solvent used in the polymerization include aromatic solvents such as toluene and xylene; ester solvents such as ethyl acetate, butyl acetate and cellosolve acetate; and ketone solvents such as methyl ethyl ketone (MEK) and methyl isobutyl ketone (MIBK). These may be used singly or in a combination of two or more.

<Component (B)>

Successively, the component (B) is explained. The polyisocyanate used in the present invention is not particularly limited as far as it has two or more isocyanate groups.

Examples thereof include: aromatic diisocyanates such as 4,4'-diphenylmethane diisocyanate, 2,4'-diphenylmethane diisocyanate, 2,2'-diphenylmethane diisocyanate, 2,4-toluene diisocyanate, 2,6-toluene diisocyanate, 4,4'-diphenylether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, 1,2-phenylene diisocyanate, 1,3-phenylene diisocyanate, 1,4-phenylene diisocyanate, 1,4-naphthalene diisocyanate, 1,5-naphthalene diisocyanate and 3,3'-dimethoxydiphenyl-4,4'-diisocyanate, aliphatic diisocyanates such as 1,6-hexamethylene diisocyanate, 1,4-tetramethylene diisocyanate and lysine diisocyanate, araliphatic diisocyanates such as o-xylene diisocyanate, m-xylene diisocyanate, p-xylene diisocyanate and tetramethylxylene diisocyanate, and alicyclic diisocyanates such as isophorone diisocyanate, hydrogenated toluene diisocyanate, hydrogenated xylene diisocyanate, hydrogenated diphenylmethane diisocyanate and hydrogenated tetramethylxylene diisocyanate.

It is permitted to use a so-called modified polyisocyanate, namely, a modified product of the above-mentioned diisocyanate. Examples thereof include an adduct modified product, a biuret modified product, an isocyanurate modified product, an uretone-imine modified product, an uretdione modified product and a carbodiimide modified product.

Further, it is permitted to use a polyisocyanate what is called a polymeric product such as polyphenylene polymethylene polyisocyanate and crude toluene diisocyanate.

Among these polyisocyanates, from a viewpoint of weather resistance or the like, preferred are aliphatic and alicyclic polyisocyanates, and the most preferred are particularly hexamethylene diisocyanate, isophorone diisocyanate, hydrogenated xylylene diisocyanate and hydrogenated diphenylmethane diisocyanate. The above-mentioned polyisocyanates may be used singly or in a combination of two or more.

In the present invention, it is permitted to use an elasticity-modified polyisocyanate in addition to the above-mentioned polyisocyanate or in place thereof as the component (B). When the elasticity-modified polyisocyanate is used in addition to the above-mentioned polyisocyanate, it is possible to make the coat film elastic, and therefore the impact resistance of the coat film can be more improved. From a viewpoint of balance between the impact resistance and the stain resistance, the elasticity-modified polyisocyanate is used in an amount of preferably from 10 to 90% by weight based on the whole weight of the component (B), and more preferably from 20 to 80% by weight based thereon.

When the component (B) contains the elasticity-modified polyisocyanate (b2) in a predetermined amount as mentioned above, it is possible to easily control the flexibility of the coat film without so greatly varying a composition between the main agent and the curing agent in the coating composition. Here, a covering material for a golf ball includes balata, ionomers and urethanes. In recent years, particularly a urethane cover is of interest. The urethane cover includes very flexible one. Therefore, high flexibility is also required for the coating used for the finishing of such a flexible covering material. In recent years, as mentioned, a coating composition used for a golf ball is required to match with all covers having various hardness of from a hard to a flexible. As mentioned above, the elasticity-modified polyisocyanate (b2) can be blended as the component (B), thereby obtaining a coating composition used for a golf ball, according to which flexibility of its coat film can be easily controlled to meet such a requirement.

Here, the elasticity-modified polyisocyanate is a prepolymer having an NCO terminal. Such a prepolymer can be obtained by using the above-mentioned diisocyanate such as tolylene diisocyanate (TDI), xylene diisocyanate (XDI), diphenylmethane diisocyanate (MDI), hexamethylene diisocyanate (HDI) and isophorone diisocyanate (IPDI) as a monomer, and subjecting the monomer and an elasticity-carrying active hydrogen-containing compound to urethanation reaction. Incidentally, conditions for the urethanation reaction are not particularly limited, and the reaction may be carried out under conventional conditions.

Examples of the elasticity-carrying active hydrogen-containing compound used for elasticity-modifying the above-mentioned polyisocyanate include polyester polyols, polycarbonate polyols, polyolefin polyols, polyether polyols, polyolefin polyols, animal and vegetable polyols and copolyols thereof. In the present invention, it is preferred that the component (B) contains a modified polyisocyanate modified with at least one polyol selected from the group consisting of polyester polyols, polyether polyols, polycarbonate polyols, polyolefin polyols, animal and vegetable polyols and copolyols thereof. Further from a viewpoint such that elasticity of the obtained coat film is more increased and the impact resistance is more improved, it is preferred that these polyols have a Tg of not higher than 0° C. These polyols may be used each alone or in a combination of two or more thereof.

Examples of the polyester polyol include polyester polyols or polyesteramide polyols, which are obtained through dehydration condensation between at least one member selected from polycarboxylic acids, their esters and their anhydrides and at least one member selected from low molecular polyols, low molecular polyamines and low molecular aminoalcohols. Examples of the polycarboxylic acid include succinic acid, adipic acid, sebacic acid, azelaic acid, terephthalic acid, isophthalic acid, orthophthalic acid, hexahydroterephthalic acid, hexahydroisophthalic acid, hexahydroorthophthalic acid, naphthalene dicarboxylic acid and trimellitic acid. Examples of the low molecular polyol include ethylene glycol, 1,2-propanediol, 1,3-propanediol, 1,2-butanediol, 1,3-butanediol, 1,4-butanediol, 1,5-pentanediol, 1,6-hexanediol, 3-methyl-1,5-pentanediol, neopentyl glycol, 1,8-octanediol, 1,9-nonanediol, diethylene glycol, dipropylene glycol, 1,4-cyclohexanedimethanol, a bisphenol-A ethylene oxide addition product, a bisphenol-A propylene oxide addition product, trimethylolpropane, glycerol and pentaerythritol. Examples of the low molecular polyamine include hexamethylenediamine, xylylenediamine and isophoronediamine. Examples of the low molecular aminoalcohol include monoethanolamine and diethanolamine. Additionally, there is exemplified a lactone polyester polyol, which is obtained through ring-opening polymerization of a cyclic ester (lactone) monomer such as ε-caprolactone and γ-valerolactone using said low molecular polyol, low molecular polyamine or low molecular aminoalcohol as an initiator.

Examples of the polycarbonate polyol include those obtained through de-alcohol reaction or de-phenol reaction between the foregoing low molecular polyol used for obtaining the polyester polyol and dimethyl carbonate, diethyl carbonate, diphenyl carbonate or the like.

Examples of the polyether polyol include polyethylene glycols, polypropylene glycols and polytetramethylene ether glycols, which are obtained through ring-opening polymerization of ethylene oxide, propylene oxide or tetrahydrofuran using the foregoing low molecular polyol, low molecular polyamine or low molecular aminoalcohol used for obtaining the polyester polyol as an initiator. Additional examples thereof include polyether polyols obtained through copolymerization of those exemplified above and polyester ether polyols obtained using the foregoing polyester polyol or polycarbonate polyol as an initiator.

Examples of the polyolefin polyol include hydroxyl group-containing polybutadiene, hydrogenated hydroxyl group-containing polybutadiene, hydroxyl group-containing polyisoprene, hydrogenated hydroxyl group-containing polyisoprene, hydroxyl group-containing chlorinated polypropylene and hydroxyl group-containing chlorinated polyethylene.

Examples of the animal and vegetable polyols include caster oil polyol and silk fibroin.

A molecular weight of these polyols is preferably from 300 to 10,000, and more preferably from 400 to 4,000.

With respect to a blending ratio of the component (A) and the component (B) in the coating composition in accordance with the present invention, it is necessary that a molar ratio of an isocyanate group in the component (B) to a hydroxyl group in the component (A), [NCO]/[OH], ranges from 0.5 to 1.5. Preferably, it ranges from 0.8 to 1.2. When the [NCO]/[OH] is less than 0.5, an unreacted hydroxyl group remains, and as a result, the coat film performance and water resisting property deteriorate. Whereas, when [NCO]/[OH] exceeds 1.5, the isocyanate group becomes excessive, so that stickiness is easy to remain on the coat film. Moreover, a urea group (brittle) is produced due to the reaction with water, so that the coat film performance deteriorates.

If desired, the coating composition used for a golf ball in accordance with the present invention may contain a conventional additive for a coating use in addition to the above-mentioned component (A) and component (B). Examples of the additive usable include a leveling agent such as DISPARLON L-1980-50 (Kusumoto Chemicals, Ltd.); an ultraviolet absorber such as Tinuvin-P (Ciba Specialty) and ASL-23 (Shonan Kagaku Kogyo Kabushiki Kaisha); an optical whitening agent such as UVITEX OB (Ciba Specialty), Hostalux KSN (Hoechst Japan) and HAKKOL PY-1800 (Hakkol Chemical); a slip agent such as DISPARLON 1711 (Kusumoto Chemicals, Ltd.), and GLANOL 450 (Kyoeisha Chemical Co., Ltd.); a photostabilizer such as ADK STAB LA-77 (Asahi Denka Kogyo K.K.), Tinuvin 622LD (Ciba Specialty); a curing catalyst such as dibutyltin dilaurate, lead naphthenate, zinc octylate, an aluminum chelate and a tertiary amine; a deforming agent such as DISPARLON OX-710 (Kusumoto Chemicals, Ltd.); a thickening agent such as DISPARLON AS-415 (Kusumoto Chemicals, Ltd.); a pigment for color such as titanium dioxide; and a plasticizer such as dioctyl phthalate and dioctyl adipate. Further, it is also permitted to add other resins such as polyester polyols and polyether polyols to the coating composition in accordance with the present invention, thereby improving workability.

The coating composition used for a golf ball in accordance with the present invention may be kneaded with a pigment, or further incorporated with a pigment for processing, whereby it can be used as enamel. Alternatively, the coating composition may be used as a clear coating without use of a pigment.

It is general that the coating composition used for a golf ball in accordance with the present invention is prepared in the form of a two component coating, wherein the component (A), namely the polyester and/or polyether-containing acrylic polyol is to be used as a base agent, and the component (B), namely the polyisocyanate is to be used as a curing agent. Incidentally, the component (A) and the component (B) may be independently blended with the above-mentioned additive, resin or the like. When the coating has a high viscosity, depending upon the finishing conditions, it may be diluted with a solvent (thinner). Alternatively, it is permitted to mix the main agent and the curing agent, both of which are diluted with a solvent in advance.

Examples of the solvent usable include aromatic solvents such as toluene, xylene and ethylbenzene, ester solvents such as ethyl acetate, butyl acetate, propylene glycol methyl ether acetate and propylene glycol methyl ether propionate, ketone solvents such as acetone, methyl ethyl ketone, methyl isobutyl ketone and cyclohexane, ether solvents such as diethylene glycol dimethyl ether, diethylene glycol diethyl ether and dipropylene glycol dimethyl ether, alicyclic hydrocarbon solvents such as cyclohexane, methylcyclohexane and ethylcyclohexane, and petroleum hydrocarbon solvents such as mineral spirit.

The coating composition used for a golf ball in accordance with the present invention is of a two component type, and the main agent and the curing agent are mixed with each other before using. The mixture is applied to a body of a golf ball, followed by drying and curing at a temperature of, for example 60° C. or less, thereby forming a coat film. Incidentally, a method for coating the coating composition may be a conventional one such as dipping, brushing, roller coating, spray coating and electrostatic coating.

A body of the golf ball to be coated with the coating composition in accordance with the present invention is not particularly limited. Any one obtained in a conventional manner, for example, a spool type golf ball and a solid golf ball such as a one-piece golf ball and a two-piece golf ball may be used. The golf ball in accordance with the present invention is that obtained by applying the coating composition used for a golf ball in accordance with the present invention to a mark-stamped body of a golf ball. A thickness of the coat film formed with the coating composition is preferably from 5 to 50 μm, and more preferably from 10 to 30 μm.

EXAMPLE

The present invention is explained in detail with reference to the following Examples, which are not intended to limit the scope of the present invention. In Examples and Comparative Examples, "parts" and "%" refer to "parts by weight" and "% by weight", respectively, unless otherwise specified. First of all, how to evaluate the coat film performance is explained.

(1) Test of Abrasion

In a 4 liter-inner volume porcelain ball mill, 10 finished golf balls and 1.5 liters of an abrasive (Shorel Nugget SN (size 5S) manufactured by Showa Denko K.K.) were put and mixed for 2 hours. Degrees of the surface scratch and gloss reduction due to abrasion were visually evaluated.

[Evaluation of Scratch]
O: Little scratch
Δ: Some scratch
X: Many scratch

[Evaluation of Gloss]
O: No gloss reduction
Δ: Some gloss reduction
X: Large gloss reduction (2) Test of Mark Protective Effect Test was carried out in the same manner as in Test of abrasion, and a degree of mark disappearance was visually evaluated.
O: Almost no loss
Δ: Partial loss
X: Great loss (3) Test of Resistance to Contamination with Grass Sap In an 8 liter-inner volume porcelain ball mill, a mixture previously prepared by mixing 500 g of a green leaf portion of spinach and 500 g of water in a mixer for 5 minutes was put. Thereafter, 10 finished golf balls were put therein, and mixed for 3 hours. Color difference (ΔE) before and after the test was measured with a color difference meter (manufactured by Nippon Denshoku Industries Co., Ltd.).
o: ΔE<10
Δ: ΔE=10~20
X: ΔE>20

(4) Test of Impact Resistance

The coat film was hit 100 times with a driver at a head speed of 45 m/sec using a hitting machine manufactured by True Temper Co. Thereafter, appearance of the coat film was visually evaluated.
⊚: No crack observed
o: Cracks somewhat observed
Δ: Cracks observed
X: Many cracks observed (5) Test of Weather Resistance Appearance of the coat film was visually evaluated after irradiation for 200 hours with a sunshine weather meter (manufactured by Suga Test Instruments Co., Ltd.).
o: No discoloration
Δ: Some discoloration
X: Great discoloration (6) Overall Evaluation Based on the above measurement results on the performance of the coating composition, an overall evaluation of the coating composition was carried out according to the following criteria.
⊚: Impact resistance is marked with ⊚, and others with o.
o: All are marked with o, or nothing is marked with X and 1 or 2 items with Δ.
Δ: Nothing is marked with X and 3 or more items with Δ, or 1 item with X.
X: Two or more items are marked with X.

<Component (A)>

According to the following synthesis examples, the polyester-containing acrylic polyols (A-1-1) to (A-1-6), the polyether-containing acrylic polyols (A-2-1) to (A-2-4), the polyester- and polyether-containing acrylic polyol (A-3) and the acrylic polyol (A-4) were synthesized as the acrylic polyol used in the coating composition.

[Synthesis Example 1 of Polyester-Containing Acrylic Polyol]

In a reactor equipped with a stirring means, a thermometer, a cooling pipe, a nitrogen gas-introducing pipe and a dropping means, 500 parts of butyl acetate and 300 parts of methyl isobutyl ketone were fed, and heated to 110° C. while stirring. A mixture 1 composed of 200 parts of a polyester-containing acrylic monomer (PLACCEL FM-3, manufactured by Daicel Chemical Industries, Ltd.), 645 parts of methyl methacrylate (MMA), 155 parts of 2-hydroxyethyl methacrylate (2-HEMA), 15 parts of 2,2'-azobisisobutyronitrile (AIBN) and 100 parts of methyl isobutyl ketone was dropped thereto over 4 hours. After completion of dropping, the reaction was continued for 1 hour at that temperature. Further, a mixture 2 composed of 5 parts of 2,2'-azobisisobutyronitrile and 100 parts of methyl isobutyl ketone was dropped thereto over 1 hour. After completion of dropping, the reaction was continued for 3 hours at that temperature, thereby obtaining a transparent polyester-containing acrylic polyol resin solution (A-1-1) having a solid content of 50.5%, viscosity of 1200 mPa.s (25° C.), a number average molecular weight of 7,000, a hydroxyl value of 89 mg KOH/g (solid), and a polyester content of 14% by weight (solid).

[Synthesis Examples 2 to 6 of Polyester-Containing Acrylic Polyols]

The polyester-containing acrylic polyol resin solutions (A-1-2) to (A-1-6) were obtained in the same manner as in Synthesis Example 1, except that compositions of respective components were changed as shown in Table 1.

TABLE 1

(Unit of amount of each component: part by wt.)

| | | A-1-1 | A-1-2 | A-1-3 | A-1-4 | A-1-5 | A-1-6 |
|---|---|---|---|---|---|---|---|
| Pracsel FM-3* | | 200 | 250 | 270 | — | 200 | — |
| Pracsel FM-1D* | | — | — | — | 300 | — | 300 |
| MMA | | 645 | 700 | 450 | 645 | 800 | 400 |
| 2-HEMA | | 155 | 50 | 280 | 55 | — | 300 |
| AIBN | In mixture 1 | 15 | — | 25 | 15 | 15 | 15 |
| | In mixture 2 | 5 | — | 5 | 5 | 5 | 5 |
| TBPO | In mixture 1 | — | 5 | — | — | — | — |
| | In mixture 2 | — | 5 | — | — | — | — |
| Butyl acetate | | 500 | 500 | 500 | 500 | 500 | 500 |
| Methyl | Fed | 300 | — | 300 | 300 | — | — |
| isobutyl | In mixture 1 | 100 | — | 100 | 100 | — | — |
| ketone | In mixture 2 | 100 | — | 100 | 100 | — | — |
| Toluene | Fed | — | 300 | — | — | 300 | 300 |
| | In mixture 1 | — | 100 | — | — | 100 | 100 |
| | In mixture 2 | — | 100 | — | — | 100 | 100 |
| Hydroxyl value (mgKOH/g, solid) | | 89 | 51 | 148 | 91 | 23 | 195 |
| Polyester content (wt. %, solid) | | 14 | 18 | 19 | 14 | 14 | 14 |

*Polyester-containing acrylic monomer manufactured by Daicel Chemical Industries, Ltd.

[Synthesis Example 1 of Polyether-Containing Acrylic Polyol]

In a reactor equipped with a stirring means, a thermometer, a cooling pipe, a nitrogen gas-introducing pipe and a dropping means, 500 parts of toluene and 300 parts of methyl isobutyl ketone were fed, and heated to 110° C. while stirring. A mixture 1 composed of 200 parts of a polyether-containing acrylic monomer (BLEMMER PP-1000, manufactured by NOF Corporation), 660 parts of methyl methacrylate, 140 parts of 2-hydroxyethyl methacrylate, 18 parts of t-butylperoxy-2-ethylhexanoate (TBPO) and 100 parts of methyl isobutyl ketone was dropped thereto over 4 hours. After completion of dropping, the reaction was continued for 1 hour at that temperature. Further, a mixture 2 composed of 2 parts of t-butylperoxy-2-ethylhexanoate and 100 parts of methyl isobutyl ketone was dropped thereto over 1 hour. After completion of dropping, the reaction was continued for 3 hours at that temperature, thereby obtaining a transparent polyether-containing acrylic polyol resin solution (A-2-1) having a solid content of 50.5%, viscosity of 2000 mPa.s (25° C.), a number average molecular weight of 8,000, a hydroxyl value of 90 mg KOH/g (solid), and a polyester content of 12% by weight (solid).

[Synthesis Examples 2 to 4 of Polyether-Containing Acrylic Polyols]

The polyether-containing acrylic polyol resin solutions (A-2-2) to (A-2-4) were obtained in the same manner as in Synthesis Example 1, except that compositions of respective components were changed as shown in Table 2.

TABLE 2

(Unit of amount of each component: part by wt.)

|  |  | A-2-1 | A-2-2 | A-2-3 | A-2-4 |
|---|---|---|---|---|---|
| Blenmer PP-1000* |  | 200 | 255 | 300 | — |
| Blenmer PP-500* |  | — | — | — | 200 |
| MMA |  | 660 | 720 | 450 | 630 |
| 2-HEMA |  | 140 | 25 | 250 | 170 |
| TBPO | In mixture 1 | 18 | 8 | 25 | 25 |
|  | In mixture 2 | 2 | 2 | 5 | 5 |
| Toluene |  | 500 | 500 | 500 | 500 |
| Methyl | Fed | 300 | 300 | 300 | 300 |
| isobutyl | In mixture 1 | 100 | 100 | 100 | 100 |
| ketone | In mixture 2 | 100 | 100 | 100 | 100 |
| Hydroxyl value (mgKOH/g, solid) |  | 90 | 50 | 151 | 91 |
| Polyether content (wt %, solid) |  | 12 | 16 | 18 | 15 |

*Polyether-containing acrylic monomer manufactured by NOF Corporation

[Synthesis Example of Polyester- and Polyether-Containing Acrylic Polyol]

In a reactor equipped with a stirring means, a thermometer, a cooling pipe, a nitrogen gas-introducing pipe and a dropping means, 500 parts of butyl acetate and 300 parts of methyl isobutyl ketone were fed, and heated to 110° C. while stirring. A mixture composed of 100 parts of a polyester-containing acrylic monomer (PLACCEL FM-3, manufactured by Daicel Chemical Industries, Ltd.), 100 parts of a polyether-containing acrylic monomer (BLEMMER PP-1000, manufactured by NOF Corporation), 650 parts of methyl methacrylate, 150 parts of 2-hydroxyethyl methacrylate, 15 parts of 2,2'-azobisisobutyronitrile and 100 parts of methyl isobutyl ketone was dropped thereto over 4 hours. After completion of dropping, the reaction was continued for 1 hour at that temperature. Further, a mixture composed of 5 parts of 2,2'-azobisisobutyronitrile and 100 parts of methyl isobutyl ketone was dropped thereto over 1 hour. After completion of dropping, the reaction was continued for 3 hours at that temperature, thereby obtaining a transparent polyester- and polyether-containing acrylic polyol resin solution (A-3) having a solid content of 50.5%, viscosity of 1500 mPa.s (25° C.), a number average molecular weight of 8,000, a hydroxyl value of 91 mg KOH/g (solid), and a polyester and polyether content of 13% by weight (solid).

[Synthesis of Acrylic Polyol]

In a reactor equipped with a stirring means, a thermometer, a cooling pipe, a nitrogen gas-introducing pipe and a dropping means, 500 parts of butyl acetate and 300 parts of methyl isobutyl ketone were fed, and heated to 110° C. while stirring. A mixture composed of 490 parts of methyl methacrylate, 300 parts of n-butyl acrylate, 210 parts of 2-hydroxyethyl methacrylate, 15 parts of 2,2'-azobisisobutyronitrile and 100 parts of methyl isobutyl ketone was dropped thereto over 4 hours. After completion of dropping, the reaction was continued for 1 hour at that temperature. Further, a mixture composed of 5 parts of 2,2'-azobisisobutyronitrile and 100 parts of methyl isobutyl ketone was dropped thereto over 1 hour. After completion of dropping, the reaction was continued for 3 hours at that temperature, thereby obtaining a transparent acrylic polyol resin solution (A-4) having a solid content of 50.5%, viscosity of 1000 mPa.s (25° C.), a number average molecular weight of 8,000, and a hydroxyl value of 90 mg KOH/g (solid).

Here, the hydroxyl value of the component (A) was measured according to JIS K 0070 7.1. More specifically, 2 to 3 g (solid) of the component (A) was accurately weighed in a 300 ml grinding Erlenmeyer flask, 10 ml of an acetylation agent (pyridine : acetic anhydride=4 : 1) was added thereto, and the mixture was allowed to stand for 1 minute. Boiling tips were introduced in the Erlenmeyer flask and a riser tube was mounted thereto. Thereafter, the Erlenmeyer flask was placed on a hot plate of about 120° C., and acetylation reaction was carried out for 30 minutes while frequently shaking the Erlenmeyer flask. After completion of the acetylation, the flask was allowed to cool and thereafter cooled with ice water without removal of the riser tube. The grinding of the Erlenmeyer flask and the riser tube were washed with 25 ml of pyridine (cool), and then further washed with 50 ml of distilled water (cool). The riser tube was removed. Successively, 4 to 5 drops of 1% phenolphthalein were added thereto as an indicator, and a titration with 1N—KOH was carried out. An end point was found when a red color continued for 30 seconds. Additionally, a blank test was carried out in a manner similar thereto, and the hydroxyl value (mg KOH/g (solid)) of the hydroxyl group-containing vinyl polymer was found from the following expression (1).

$$\text{Hydroxyl value} = [\{(B-A) \times 56.1 \times f\} \times 1/C] + \text{acid value} \quad (1)$$

In the expression (1), A is an amount (ml) of 1N—KOH required for the titration of the component (A), B is an amount (ml) of 1N—KOH required for the titration of the blank, f is a factor of 1N—KOH, C is a weighed amount (g) of the component (A), and the acid value is a value (mg KOH/g (solid)) measured according to JIS K 0070 3.1 and obtained from the following expression (2).

That is, the "acid value" of the component (A) in the expression (1) is a value obtained in the following manner using the following expression (2). In a conical beaker of 300 ml, 2 to 3 g (solid) of the component (A) was accurately weighed, and 50 ml of a mixed solvent of ethanol and benzene (ethanol:benzene=1:1) was added thereto to dissolve the polymer. Thereafter, 4 to 5 drops of phenolphthalein were added thereto as an indicator, and a titration was carried out with 0.1N—NaOH (the end point was found when a red color continued for 30 seconds). Additionally, a blank test was carried out in a manner similar thereto.

$$\text{Acid value} = [(D-E) \times 56.1 \times f \times 0.1]/F \quad (2)$$

In the-expression (2), D is an amount (ml) of 0.1N—NaOH required for the titration of the component (A), E is an amount (ml) of 0.1N—NaOH required for the titration of the blank, f is a factor of 0.1N—NaOH and F is a weighed amount (g) of the component (A).

<Component (B)>

Among the polyisocyanates used for the coating composition, as the polyisocyanate freed from elasticity modification (B-1) a commercially available isocyanurate modified product of hexamethylene diisocyanate (CORONATE HX, manufactured by Nippon Polyurethane Industry Co., Ltd.) was used. On the other hand, the elasticity-modified polyisocyanates (B-2) to (B-4) were obtained according to the following Synthesis Examples.

[Synthesis of Polyester Modified Polyisocyanate]

In a reactor equipped with a stirring means, a thermometer, a cooling pipe and a nitrogen gas-introducing pipe, 333 parts of hexamethylene diisocyanate, 667 parts of polycaprolactonediol (PLACCEL L205AL: molecular weight 500, manufactured by Daicel Chemical Industries, Ltd.) and 250 parts of butyl acetate were fed, and heated to 75° C. while stirring. The reaction was continued for 4 hours at that temperature, thereby obtaining a polyester modified polyisocyanate solution (B-2) having a solid content of 80.0%, an NCO content of 4.2% and a number average molecular weight of 4500.

[Synthesis of Polyether Modified Polyisocyanate]

In a reactor equipped with a stirring means, a thermometer, a cooling pipe and a nitrogen gas-introducing pipe, 300 parts of isophorone diisocyanate, 700 parts of polypropylene glycol (SANNIX PP-1000: molecular weight 1000, manufactured by Sanyo Chemical Industries, Ltd.) and 250 parts of toluene were fed, and heated to 75° C. while stirring. The reaction was continued for 8 hours at that temperature, thereby obtaining a polyether modified polyisocyanate solution (B-3) having a solid content of 80.0%, an NCO content of 4.3% and a number average molecular weight of 4800.

[Synthesis of Polycarbonate Modified Polyisocyanate]

In a reactor equipped with a stirring means, a thermometer, a cooling pipe and a nitrogen gas-introducing pipe, 205 parts of hydrogenated xylylene diisocyanate, 795 parts of polycarbonatediol (NIPPOLLAN 982N: molecular weight 2000, manufactured by Nippon Polyurethane Industry Co., Ltd.) and 250 parts of butyl acetate were fed, and heated to 75° C. while stirring. The reaction was continued for 6 hours at that temperature, thereby obtaining a polycarbonate modified polyisocyanate solution (B-4) having a solid content of 80.0%, an NCO content of 4.2% and a number average molecular weight of 4600.

For the comparative purpose, a polyester polyol was synthesized according to the following Synthesis Example.

[Synthesis of Polyester Polyol]

In a reactor equipped with a stirring means, a thermometer, a cooling pipe and a nitrogen gas-introducing pipe, 200 parts of adipic acid, 100 parts of phthalic acid, 50 parts of diethylene glycol, 50 parts of 1,4-cyclohexanedimethanol, 80 parts of neopentyl glycol and 100 parts of trimethylolpropane were fed, and heated to 240° C. while stirring. The reaction was continued for 6 hours at that temperature, while removing condensation water, thereby obtaining a transparent polyester polyol resin having a solid content of 100%, a number average molecular weight of 12,000, a hydroxyl value of 166 mg KOH/g and an acid value of 4 mg KOH/g.

[Preparation of Coating Composition and Performance Evaluation of Coat Film]

Respective components were blended at each proportion as shown in Tables 3 to 7, thereby obtaining respective coating compositions. A two-piece ball was coated with the obtained coating composition using a spray gun, and dried for 1 hour at 60° C. and further for 48 hours at 23° C. The resulting golf ball was tested by the methods described above to evaluate the coat film performance. The results are as shown in Tables 3 to 7.

TABLE 3

|  |  | Example 1 | Example 2 | Example 3 | Example 4 | Example 5 | Example 6 | Example 7 |
|---|---|---|---|---|---|---|---|---|
| Main agent | Acrylic polyol | A-1-1 100 | A-1-1 100 | A-1-1 100 | A-1-1 100 | A-1-1 100 | A-1-1 100 | A-1-1 100 |
|  | Polyester polyol | — | — | — | — | — | — | — |
|  | Polycaprolactone diol | — | — | — | — | — | — | — |
|  | Methyl isobutyl ketone | — | — | — | — | — | — | — |
| Curing agent |  | B-1/B-2 | B-1/B-3 | B-1/B-4 | B-1/B-2 | B-1/B-4 | B-1 | B-2 |
|  | Polyisocyanate | 8/40 | 8/40 | 8/40 | 4.8/54 | 5/55 | 16 | 80 |
|  | Methyl isobutyl ketone | 20 | 20 | 20 | 20 | 26 | 16 | 48 |
|  | Butyl acetate | 12 | 12 | 12 | 17.2 | 12 | — | — |
|  | Curing catalyst | 0.03 | 0.03 | 0.03 | 0.03 | 0.03 | 0.03 | 0.03 |
| Thinner | Ethyl acetate | 10 | 10 | 10 | 10 | 10 | 10 | 20 |
|  | Butyl acetate | 20 | 20 | 20 | 20 | 20 | 20 | 20 |
|  | Methyl isobutyl ketone | 20 | 20 | 20 | 20 | 20 | 10 | 30 |
|  | Propylene glycol methyl ether acetate | 30 | 30 | 30 | 30 | 30 | 20 | 30 |
|  | Blending ratio (NCO/OH) | 1.0 | 1.0 | 1.0 | 1.0 | 1.0 | 1.0 | 1.0 |
| Performance evaluation | Scratch | ◯ | ◯ | ◯ | ◯ | ◯ | ◯ | ◯ |
|  | Gloss | ◯ | ◯ | ◯ | ◯ | ◯ | ◯ | ◯ |
|  | Mark protection | ◯ | ◯ | ◯ | ◯ | ◯ | ◯ | ◯ |
|  | Impact resistance | ◎ | ◎ | ◎ | ◎ | ◎ | ◯ | ◎ |
|  | Resistance to contamination with grass sap | ◯ | ◯ | ◯ | Δ | Δ | ◯ | Δ |
|  | Weather resistance | ◯ | ◯ | ◯ | ◯ | ◯ | ◯ | Δ |
|  | Overall evaluation | ◎ | ◎ | ◎ | ◯ | ◯ | ◯ | ◯ |

TABLE 4

|  |  | Example 8 | Example 9 | Example 10 | Example 11 | Example 12 | Example 13 |
|---|---|---|---|---|---|---|---|
| Main agent | Acrylic polyol | A-1-2 100 | A-1-3 100 | A-1-4 100 | A-1-1 100 | A-1-1 100 | A-1-1 100 |
|  | Polyester polyol | — | — | — | — | — | — |
|  | Polycaprolactone diol | — | — | — | — | — | 5 |
|  | Methyl isobutyl ketone | — | — | — | — | — | 5 |
| Curing agent | Polyisocyanate | B-1/B-2 5/22 | B-1/B-2 18/42 | B-1/B-2 8/40 | B-1/B-2 6.4/32 | B-1/B-2 9.6/48 | B-1/B-2 15/25 |
|  | Methyl isobutyl ketone | 11 | 20 | 20 | 15 | 20 | 20 |
|  | Butyl acetate | 7.2 | 23.2 | 12 | 10.6 | 18.4 | 10 |
|  | Curing catalyst | 0.03 | 0.03 | 0.03 | 0.03 | 0.03 | 0.03 |
| Thinner | Ethyl acetate | 10 | 5 | 10 | 10 | 10 | 10 |
|  | Butyl acetate | 20 | 25 | 20 | 10 | 20 | 20 |
|  | Methyl isobutyl ketone | 20 | 20 | 20 | 20 | 20 | 20 |
|  | Propylene glycol methyl ether acetate | 10 | 30 | 30 | 30 | 30 | 30 |
|  | Blending ratio (NCO/OH) | 1.0 | 1.0 | 1.0 | 0.8 | 1.2 | 1.0 |
| Performance evaluation | Scratch | ○ | ○ | ○ | ○ | ○ | ○ |
|  | Gloss | ○ | ○ | ○ | Δ | ○ | ○ |
|  | Mark protection | Δ | ○ | ○ | Δ | ○ | ○ |
|  | Impact resistance | ◎ | ◎ | ◎ | ◎ | ○ | ◎ |
|  | Resistance to contamination with grass sap | ○ | Δ | ○ | ○ | Δ | ○ |
|  | Weather resistance | ○ | Δ | ○ | ○ | Δ | ○ |
|  | Overall evaluation | ○ | ○ | ◎ | ○ | ○ | ◎ |

TABLE 5

|  |  | Example 14 | Example 15 | Example 16 | Example 17 | Example 18 | Example 19 | Example 20 |
|---|---|---|---|---|---|---|---|---|
| Main agent | Acrylic polyol | A-2-1 100 | A-2-1 100 | A-2-1 100 | A-2-1 100 | A-2-2 100 | A-2-3 100 | A-2-4 100 |
|  | Polyester polyol | — | — | — | — | — | — | — |
|  | Polycaprolactone diol | — | — | — | — | — | — | — |
|  | Methyl isobutyl ketone | — | — | — | — | — | — | — |
| Curing agent | Polyisocyanate | B-1/B-2 8/40 | B-1/B-3 8/40 | B-1/B-4 8/40 | B-1/B-3 5/55 | B-1/B-3 5/22 | B-1/B-3 18/42 | B-1/B-3 8/40 |
|  | Methyl isobutyl ketone | 20 | 20 | 20 | 26 | 11 | 20 | 20 |
|  | Butyl acetate | 12 | 12 | 12 | 12 | 7.2 | 23.2 | 12 |
|  | Curing catalyst | 0.03 | 0.03 | 0.03 | 0.03 | 0.03 | 0.03 | 0.03 |
| Thinner | Ethyl acetate | 5 | 5 | 5 | 5 | 5 | 5 | 5 |
|  | Butyl acetate | 25 | 25 | 25 | 25 | 25 | 25 | 25 |
|  | Methyl isobutyl ketone | 20 | 20 | 20 | 20 | 20 | 20 | 20 |
|  | Propylene glycol methyl ether acetate | 30 | 30 | 30 | 30 | 10 | 30 | 30 |
|  | Blending ratio (NCO/OH) | 1.0 | 1.0 | 1.0 | 1.0 | 1.0 | 1.0 | 1.0 |
| Performance evaluation | Scratch | ○ | ○ | ○ | ○ | ○ | ○ | ○ |
|  | Gloss | ○ | ○ | ○ | ○ | ○ | ○ | ○ |
|  | Mark protection | ○ | ○ | ○ | ○ | Δ | ○ | ○ |
|  | Impact resistance | ◎ | ◎ | ◎ | ◎ | ◎ | ◎ | ◎ |
|  | Resistance to contamination with grass sap | ○ | ○ | ○ | Δ | ○ | Δ | ○ |
|  | Weather resistance | ○ | ○ | ○ | ○ | ○ | Δ | ○ |
|  | Overall evaluation | ◎ | ◎ | ◎ | ○ | ○ | ○ | ◎ |

TABLE 6

|  |  | Example 21 | Example 22 |
|---|---|---|---|
| Main agent | Acrylic polyol | A-3 100 | A-1-1/A-2-1 50/50 |
|  | Polyester polyol | — | — |
|  | Polycaprolactone diol | — | — |
|  | Methyl isobutyl ketone | — | — |
| Curing agent | Polyisocyanate | B-1/B-2 8/40 | B-1/B-2 8/40 |
|  | Methyl isobutyl ketone | 20 | 20 |
|  | Butyl acetate | 12 | 12 |
| Curing catalyst |  | 0.03 | 0.03 |
| Thinner | Ethyl acetate | 10 | 10 |
|  | Butyl acetate | 20 | 20 |
|  | Methyl isobutyl ketone | 20 | 20 |
|  | Propylene glycol methyl ether acetate | 30 | 30 |
|  | Blending ratio (NCO/OH) | 1.0 | 1.0 |
| Performance evaluation | Scratch | ○ | ○ |
|  | Gloss | ○ | ○ |
|  | Mark protection | ○ | ○ |
|  | Impact resistance | ◎ | ◎ |
|  | Resistance to contamination with grass sap | ○ | ○ |

TABLE 6-continued

|  | Example 21 | Example 22 |
|---|---|---|
| Weather resistance | ○ | ○ |
| Overall evaluation | ⊚ | ⊚ |

TABLE 7

| | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Main agent | Acrylic polyol | A-4 | A-4 | A-4 | — | A-1-5 | A-1-6 | A-1-1 | A-1-1 |
| | | 100 | 80 | 50 | — | 100 | 100 | 100 | 100 |
| | Polyester polyol | — | 10 | 25 | 50 | — | — | — | — |
| | Polycaprolactone diol | — | — | — | — | — | — | — | — |
| | Methyl isobutyl ketone | — | 10 | 25 | 50 | — | — | — | — |
| Curing agent | Polyisocyante | B-1 | B-1 | B-1 | B-1 | B-1/B-2 | B-1/B-2 | B-1/B-2 | B-1/B-2 |
| | | 16 | 19 | 23 | 30 | 2/11 | 25/45 | 3.2/16 | 12.8/64 |
| | Methyl isobutyl ketone | 16 | 19 | 23 | 30 | 8.6 | 30 | 12.8 | 30 |
| | Butyl acetate | — | — | — | — | — | 22 | — | 21.2 |
| | Curing catalyst | 0.03 | 0.03 | 0.03 | 0.03 | 0.03 | 0.03 | 0.03 | 0.03 |
| Thinner | Ethyl acetate | 10 | 10 | 10 | 10 | 10 | 20 | 5 | 30 |
| | Butyl acetate | 10 | 10 | 20 | 20 | 10 | 20 | 10 | 20 |
| | Methyl isobutyl ketone | 10 | 20 | 10 | 20 | 10 | 20 | 20 | 20 |
| | Propylene glycol methyl ether acetate | 20 | 20 | 20 | 20 | 20 | 30 | 20 | 30 |
| | Blending ratio (NCO/OH) | 1.0 | 1.0 | 1.0 | 1.0 | 1.0 | 1.0 | 0.4 | 1.6 |
| Performance evaluation | Scratch | X | X | Δ | ○ | Δ | Δ | X | ○ |
| | Gloss | X | Δ | Δ | ○ | Δ | ○ | X | ○ |
| | Mark protection | X | Δ | Δ | Δ | X | ○ | X | Δ |
| | Impact resistance | X | X | Δ | ○ | ○ | Δ | Δ | Δ |
| | Resistance to contamination with grass sap | ○ | ○ | ○ | ○ | Δ | X | Δ | X |
| | Weather resistance | ○ | Δ | Δ | X | Δ | X | Δ | X |
| | Overall evaluation | X | X | Δ | Δ | Δ | X | X | X |

As clear from the results shown in Tables 3 to 7, the present coating composition comprising the polyester- and/or polyether-containing acrylic polyol of a specific hydroxyl value is very superior in abrasion resistance and impact resistance of the obtained coat film to the coating composition comprising the acrylic polyol and the coating compositions comprising the acrylic polyol and the polyester polyol (Comparative Examples 1 to 3). Incidentally, the coating composition comprising the polyester polyol (Comparative Example 4) is remarkably inferior in weather resistance of the coat film to the present coating composition.

Further, when the hydroxyl value of the polyester- and/or polyether-containing acrylic polyol is decreased, it is apt to lose a mark protective effect due to decrease in strength of the coat film (Examples 8 and 18). When it is less than the limit as defined in the present invention, an abrasion resistant characteristic required for the coat film of a golf ball cannot be satisfied (Comparative Example 5). On the other hand, when the hydroxyl value of the polyester- and/or polyether-containing acrylic polyol is increased, it is observed that resistance to contamination with grass sap and weather resistance are apt to deteriorate (Examples 9 and 19). When it exceeds the limit as defined in the present invention, it is clear that not only the resistance to contamination with grass sap and weather resistance but also the impact resistance of the coat film deteriorate (Comparative Example 6).

Further, with respect to a blending ratio between the main agent and the curing agent, an amount of the OH group is increased with gradual decrease in the abrasion resistant characteristic of the coat film (Example 11). When it exceeds the limit as defined in the present invention, the abrasion resistant characteristic required for the coat film cannot be exhibited (Comparative Example 7). When an amount of the NCO group is increased, it is apt that the impact resistance, resistance to contamination with grass sap and weather resistance deteriorate little by little (Example 12). When it exceeds the limit as defined in the present invention, it is observed that those characteristics remarkably deteriorate (Comparative Example 8).

Furthermore, the coating composition comprising the elasticity-modified polyisocyanate as the polyisocyanate of the component (B) is improved in flexibility of the coat film, and therefore the impact resistance of the coat film can be improved as compared with the coating composition comprising no elasticity-modified polyisocyanate (Example 6). Incidentally, when a content of the elasticity-modified polyisocyanate in the coating composition is increased (Examples 4, 5 and 17), or when only the elasticity-modified polyisocyanate is used as the polyisocyanate (Example 7), the flexibility of the coat film is markedly increased, but the resistance to contamination with grass sap of the coat film is apt to somewhat deteriorate.

As mentioned above, the coating composition used for a golf ball in accordance with the present invention is markedly improved in the abrasion resistance and the impact resistance, and also superior in the weather resistance, as compared with a conventional one. Further, when the elasticity-modified polyisocyanate is contained as the polyisocyanate of the curing agent, flexibility of the coat film obtained can be remarkably increased, and therefore it is possible to more improve impact resistance of the coat film.

When the elasticity-modified polyisocyanate is contained in a predetermined amount as the curing agent, it is possible to easily control the flexibility of the coat film, without so greatly varying a composition between the main agent and the curing agent in the coating composition. As a result, there is provided a coating composition used for a golf ball, which can easily match with all covers having various hardness of from a hard to a flexible.

What is claimed is:

1. A coating composition used for a golf ball, which comprises (A) a polyester- and/or polyether-containing acrylic polyol having a hydroxyl value of from 30 to 180 mg KOH/g(solid) and (B) one or more polyisocyanates, wherein the component (A) is composed of a main chain comprising an acrylic polymer and a side chain comprising a polyester and/or a polyether, and a molar ratio of an isocyanate group in the component (B) to a hydroxyl group in the component (A), [NCO]/[OH], is more than 0.8 and less than 1.2, the component (B) comprises a mixture of at least one of elasticity-unmodified polyisocyanate and at least one of elasticity-modified polyisocyanate, the elasticity-modified polyisocyanate being modified with at least one of polyol selected from the group consisting of polyester polyols, polycarbonate polyols, polyolefin polyols, polyether polyols, animal and vegetable polyols and copolyols thereof, and the elasticity modified polyisocyanate is used in an amount of from 10 to 90% by weight based on the whole weight of the component (B), and the elasticity-modified polyisocyanate is modified in advance of curing the coating composition.

2. The coating composition used for a golf ball according to claim 1, wherein an amount of the polyester and/or the polyether is from 2 to 50% by weight (solid) based on the whole weight of the component (A).

3. The coating composition used for a golf ball according to claim 1, wherein the component (A) is a copolymer comprising at least two acrylic monomers, wherein said monomer comprises a polyester-containing acrylic monomer (a1) and/or a polyether-containing acrylic monomer (a2), and an amount of the monomer (a1) and/or (a2) is from 5 to 50% by weight based on the whole weight of the monomers.

4. The coating composition used for a golf ball according to claim 1, wherein an amount of the polyester and/or the polyether is from 2 to 50% by weight (solid) based on the whole weight of the component (A), and the component (A) is a copolymer comprising at least two acrylic monomers, wherein said monomer comprises a polyester-containing acrylic monomer (a1) and/or a polyether-containing acrylic monomer (a2), and an amount of the monomer (a1) and/or (a2) is from 5 to 50% by weight based on the whole weight of the monomers.

5. A golf ball coated with a coating composition used for a golf ball comprising (A) a polyester- and/or polyether-containing acrylic polyol having a hydroxyl value of from 30 to 180 mg KOH/g(solid) and (B) one or more polyisocyanates, wherein the component (A) is composed of a main chain comprising an acrylic polymer and a side chain comprising a polyester and/or a polyether, and a molar ratio of an isocyanate group in the component (B) to a hydroxyl group in the component (A), [NCO]/[OH], is more than 0.8 and less than 1.2, the component (B) comprises a mixture of at least one of elasticity-unmodified polyisocyanate and at least one of elasticity-modified polyisocyanate, the elasticity-modified polyisocyanate being modified with at least one of polyol selected from the group consisting of polyester polyols, polycarbonate polyols, polyolefin polyols, polyether polyols, animal and vegetable polyols and copolyols thereof, and the elasticity modified polyisocyanate is used in an amount of from 10 to 90% by weight based on the whole weight of the component (B).

6. The golf ball according to claim 5, wherein an amount of the polyester and/or the polyether is from 2 to 50% by weight (solid) based on the whole weight of the component (A), and the component (A) is a copolymer comprising at least two acrylic monomers, wherein said monomer comprises a polyester-containing acrylic monomer (a1) and/or a polyether-containing acrylic monomer (a2), and an amount of the monomer (a1) and/or (a2) is from 5 to 50% by weight based on the whole weight of the monomers, and the component (B) comprises a modified polyisocyanate, which is modified with at least one polyol selected from the group consisting of a polyester polyol, a polyether polyol, a polycarbonate polyol, a polyolefin polyol, an animal or vegetable polyol and a copolyol thereof.

7. A method of producing a coating composition used for a golf ball, the method comprising:

(i) preparing (A) a polyester- and/or polyether-containing acrylic polyol having a hydroxyl value of from 30 to 148 mg KOH/g (solid) by solution polymerization;

(ii) preparing (B) an elasticity-modified polyisocyanate by subjecting an isocyanate compound and at least one of polyol selected from the group consisting of polyester polyols, polyether polyols, polycarbonate polyols, polyolefin polyols, and/or animal and vegetable polyols to a urethane reaction;

(iii) blending the product of step (ii) with an unmodified polyisocyanate; and (iv) blending the product of step (i) and the product of step (iii) so that a molar ratio of an isocyanate group in the component (B) to a hydroxyl group in the component (A), [NCO]/[OH], is more than 0.8 and less than 1.2.

* * * * *